(12) United States Patent
Garrett et al.

(10) Patent No.: US 7,674,925 B2
(45) Date of Patent: Mar. 9, 2010

(54) POLYOLS FROM PLANT OILS AND METHODS OF CONVERSION

(75) Inventors: Thomas M. Garrett, Corona, CA (US); Xian Xia Du, Pittsburg, KS (US)

(73) Assignee: Athletic Polymer Systems, Inc., Corona, CA (US)

( * ) Notice: Subject to any disclaimer, the term of this patent is extended or adjusted under 35 U.S.C. 154(b) by 745 days.

(21) Appl. No.: 11/524,603

(22) Filed: Sep. 21, 2006

(65) Prior Publication Data

US 2008/0076901 A1  Mar. 27, 2008

(51) Int. Cl.
*C09F 7/00*     (2006.01)
*C07C 229/00*   (2006.01)

(52) U.S. Cl. ............... 554/26; 554/8; 554/9; 585/520; 585/721; 560/172; 560/236

(58) Field of Classification Search ............... 528/74.5, 528/85; 554/26, 149, 168; 585/721, 520; 560/172, 236
See application file for complete search history.

(56) References Cited

U.S. PATENT DOCUMENTS

| | | | |
|---|---|---|---|
| 2,882,249 A | | 4/1959 | Posnansky |
| 3,485,779 A | * | 12/1969 | Schneider et al. ............. 528/85 |
| 4,025,477 A | | 5/1977 | Borden et al. |
| 4,094,838 A | | 6/1978 | Schneider et al. |
| 4,174,329 A | | 11/1979 | Bell et al. |
| 4,508,853 A | | 4/1985 | Kluth et al. |
| 4,551,517 A | | 11/1985 | Herold et al. |
| 4,742,087 A | | 5/1988 | Kluth et al. |
| 4,886,893 A | | 12/1989 | Meffert et al. |
| 5,104,737 A | * | 4/1992 | Arora ...................... 428/423.1 |
| 5,266,714 A | | 11/1993 | Stoll et al. |
| 5,302,626 A | | 4/1994 | Hoefer et al. |
| 5,476,969 A | | 12/1995 | Hinz et al. |
| 6,107,433 A | | 8/2000 | Petrovic et al. |
| 6,121,398 A | | 9/2000 | Wool et al. |
| 6,180,686 B1 | | 1/2001 | Kurth |
| 6,686,435 B1 | | 2/2004 | Petrovic et al. |
| 6,762,274 B2 | | 7/2004 | Waddington et al. |
| 6,891,053 B2 | | 5/2005 | Chasar et al. |
| 6,924,321 B2 | | 8/2005 | Casati et al. |
| 7,537,665 B2 | * | 5/2009 | Kurth et al. .................... 156/72 |
| 2006/0041157 A1 | | 2/2006 | Petrovic et al. |

OTHER PUBLICATIONS de Kraker, J.W. ; Schurink, M.; Franssen, M.C.R. ; Konig, W. A; de Groot, A.; and Bouwmeester, H.J.. "Hydroxylation of Sesquiterpenes by Enzymes From Chicory (*Cichorium intybus L.*) Roots." *Tetrahedron*, 59(2003), pp. 409-418.

Cirino, P.C. and Arnold, F.H. . "Regioselectivity and Activity of Cytochrome P450 BM-3 and Mutant F87A in Reactions Driven by Hydrogen Peroxide." *Advance Synthetics Catalog* 344, No. 9(2002), pp. 932-937.

Groves, J.T. and Viski, P. . "Asymmetric Hydroxylation by a Chiral Iron Porphyrin." *Journal of American Chemistry Society* 111(1989), pp. 8537-8538.

Balandrian, M. F.; Klocke, J.A.; Wurtele, E.S. ; Bollinger, W.H.. "Natural Plant Chemicals: Sources of Industrial and Medicinal Materials." *Science*, 228(1985), pp. 1154-1160.

Findly, T.W.; Swern, D. and Scanlan, J.T. . "Epoxidation of Unsaturated Fatty Materials with Peracetic Acid in Glacial Acetic Acid Solution." *Journal American Chemistry Society*, vol. 67(1945), pp. 412-414.

Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

*Primary Examiner*—Randy Gulakowski
*Assistant Examiner*—Michael Leonard
(74) *Attorney, Agent, or Firm*—John C. McMahon

(57) ABSTRACT

Methods of producing plant polyols from plant oils include reacting a plant oil with a designed reactant having one or more nucleophilic functional groups and one or more active hydrogen functional groups in the presence of an addition reaction catalyst in a single reaction step. The resultant polyols may be directly reacted with polyisocyanates to produce polyurethanes.

8 Claims, No Drawings

POLYOLS FROM PLANT OILS AND METHODS OF CONVERSION

BACKGROUND OF THE INVENTION

The present application relates to the conversion of plant oils to polyols suitable for use as raw materials in the manufacture of polyurethanes, and in particular to such conversions utilizing a synthetic pathway that does not include an epoxidation process.

The manufacture of polyurethanes from polyisocyanates requires readily available coreactants at reasonable prices. These materials are known in the art as polyols. Polyols may be defined as reactive substances, usually liquids, that contain at least two isocyanate-reacting groups attached to a single molecule. Such isocyanate reacting groups are also known as "active hydrogen" groups as they typically give a hydrogen atom to the isocyanate nitrogen to form a urethane. For example, an alcohol group includes an active hydrogen and reacts with isocyanate to form a urethane as shown below:

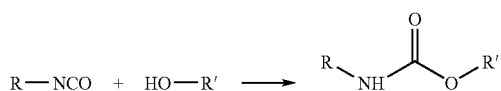

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixtures of fatty acids. Typically, they contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance could yield low cost polyols if the plant oils could be functionalized with active hydrogen groups, such as alcohols, without the problems inherent in the epoxide synthetic pathway currently used in the production of most plant polyols. For example, almost all of the commercially available polyols made from soybean oil are manufactured in a two step process beginning with the epoxidation of soybean oil. Such process is well known in the art, and may be shown as follows:

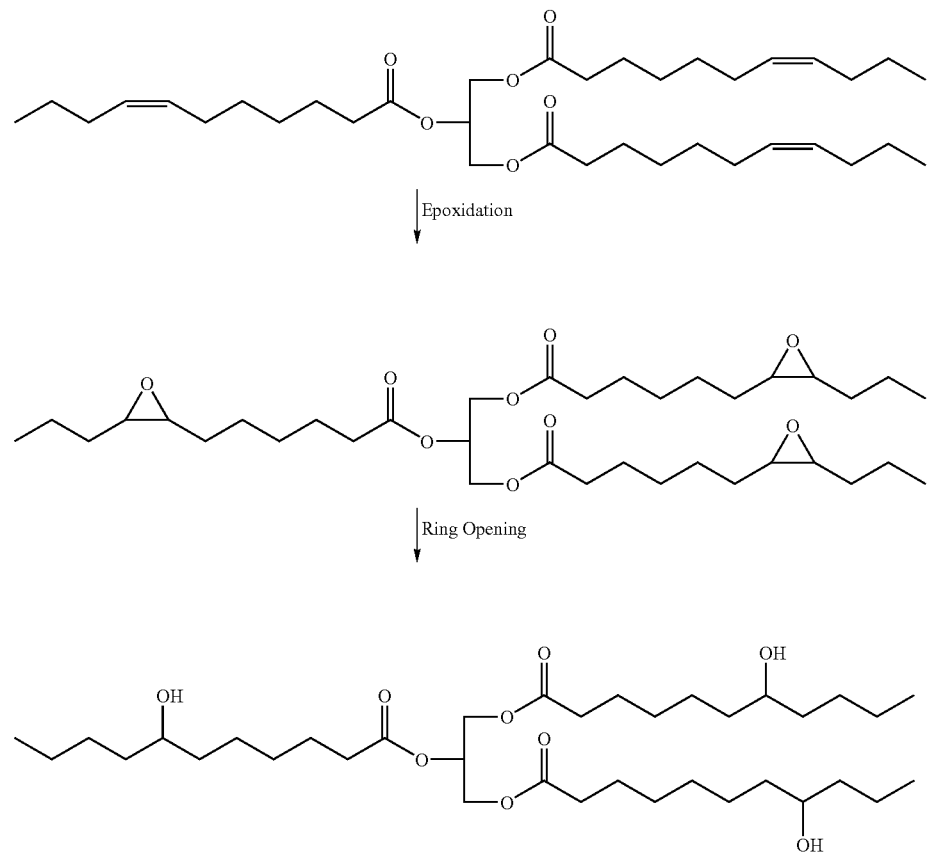

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. In fact, it is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, typically must choose between inexpensive, high viscosity raw materials that are dark in color or expensive, low viscosity, lighter colored materials. Products from both materials may have poor physical properties that limit market acceptance. Furthermore, such poor properties may limit the amounts such materials are added to polyurethane formulations. Ideally, a plant polyol reactant would be a low cost, low viscosity and light colored raw material comparable to those derived from fossil fuels. However, because of the problems inherent in opening the epoxide ring of epoxidized plant oils, such as epoxidized soybean oil, such physical properties are not possible with the currently available technology.

It is noted that it is known in the art to hydroxylate hydrocarbons by biological methods. However, to date, such processes have proven uneconomical. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing these polyols has resulted in limited market acceptance.

It is noted that Gast et al., U.S. Pat. No. 3,485,779 (hereafter the '779 patent) discloses reactions of hydroxylamines with triglycerides. Specifically that linseed and soybean N,N-bis-hydroxyalkyl fatty amides can be obtained by a strong base sodium methoxide catalyzed aminolysis of linseed oil and soybean oil. Such a reaction may be set forth as follows:

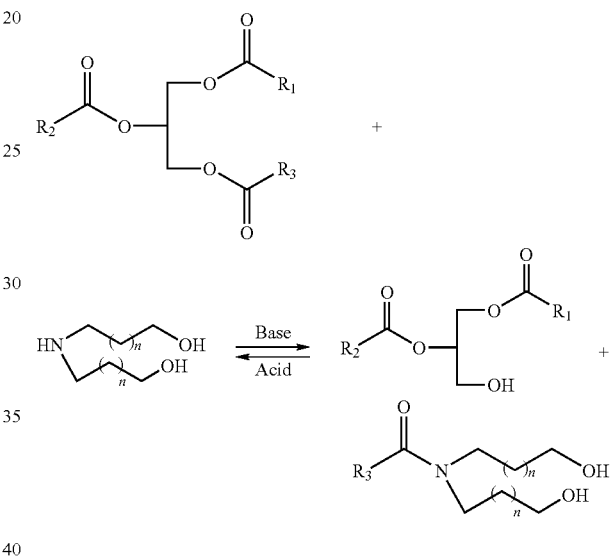

It is further noted that the '779 patent reports that reactions of that invention are inhibited by HX, thus teaching against the invention of the present application that teaches the use of HX as a catalyst.

Schneider et al., U.S. Pat. No. 4,094,838 (hereafter the '838 patent) discloses soybean N,N,-bis-hydroxy ethyl fatty amide that can be used to make water-dispersible polyurethane coatings as a small molecule polyol of polyurethane resin. The '838 patent teaches diethanolamine as a preferred amidating agent in a base catalyzed aminolysis. The preferred catalyst being sodium methoxide.

SUMMARY OF THE INVENTION

Plant-based polyols according to the invention are a reaction product of at least one plant oil having at least one carbon-carbon double bond and a reactant having at least one nucleophilic functional group and at least one active hydrogen functional group, the reaction being performed in the presence of an addition reaction catalyst. Polyurethanes of the invention are prepared by reaction mixture of polyols of the invention with an isocyanate.

According to methods of the invention, the unsaturated sites in plant polyols are directly functionalized to yield polyols in a one-step process. For example, hydrogen groups, such as hydroxyls are efficiently and directly added to the olefin groups of plant oils. Such reactions according to the invention proceed without epoxidation, thereby avoiding challenges and problems inherent in the epoxide synthetic pathway.

OBJECTS OF THE INVENTION

Therefore, an object of the present invention is to provide compositions and methods that solve one or more of the problems described above. Another object of the invention is to provide compositions and methods that utilize renewable resources, such as agriculturally derived plant oils, for conversion into polyols that can be used as raw materials in the manufacture of polymers, such as polyurethanes. A further object of the invention is to provide such plant polyols that are reactive, lack steric hindrance, are of low cost, low viscosity and are light in color. Another object of the invention is to provide plant polyols in a process that results in a low number of by-products. A further object is to provide such compositions and methods that exhibit properties similar to petroleum-based reactants. Furthermore, an object of the invention is to provide methods, reactants and products made therefrom that are inexpensive to produce and especially well adapted for the intended usage thereof.

Other objects and advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

According to a method of the invention, polyols are produced by addition of a designed reactant, N-AH, to olefin groups of a plant oil wherein N includes at least one nucleophilic functional group and AH is a functional group having at least one active hydrogen or masked active hydrogen. The reaction is catalyzed by an addition reaction in which at least one of the functional groups added in the transition state by the catalyst is a good leaving group. A synthetic pathway according to the invention is as follows:

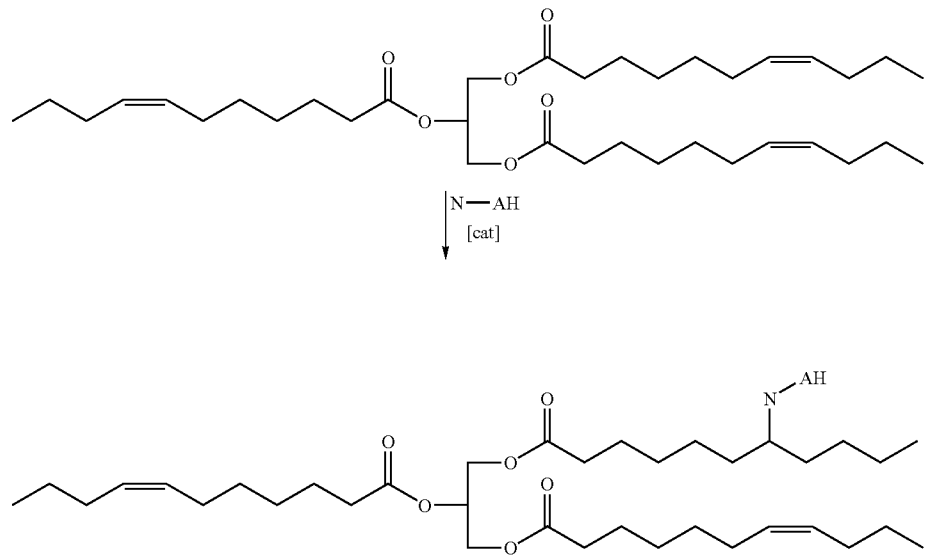

It is believed that the prevalence of the commercial use of the epoxide synthetic pathway to produce plant polyols is due to a general belief in the art, based upon the findings of numerous authors, that the unsaturated sites in plant polyols cannot be directly, efficiently functionalized to yield polyols. However, as shown above and described herein, a more desirable direct method is possible according to the present invention.

Suitable plant oils for use according to the invention are any plant oil or oil blends containing sites of unsaturation. Such suitable plant oils include, but are not limited to: corn oil, soybean oil, rapeseed oil, sunflower oil, sesame seed oil, peanut oil, safflower oil, olive oil, cotton seed oil, linseed oil, walnut oil and tung oil and mixtures thereof. It is also foreseen that other oils or blends of oils containing sites of unsaturation may be processed according to the invention, including but not limited to natural, genetic, biotic and blends thereof.

Suitable nucleophilic functional groups according to the invention include, but are not limited to amines, thiols and phosphines. Suitable active hydrogen functional groups according to the invention include but are not limited to amines, thiols and carboxylic acids.

A preferred designed reactant according to the invention is a polyhydroxylalkyl amine. For example, according to the invention, the hydroxyl groups of dihydroxyalkylamines that were used to make plant polyols of the invention include primary hydroxyl groups such as diethanolamine, and secondary hydroxyl groups such as bis(2-hydroxypropyl)amine. Preferred alkyl groups of dihydroxyalkylamines used according to the invention are those containing 2 to 12 carbon atoms such as methyl, ethyl, propyl, butyl, pentyl, hexyl, heptyl, octyl, nonyl, decyl, and dodecyl groups. Suitable amines of dihydroxyalkylamines of the invention are secondary amines, primary amines, and diamines such as N,N-bis(2-hydroxyethyl)ethylene diamine and N,N'-bis(2-hydroxyethyl)ethylene diamine.

Processes according to the invention are catalyzed by molecules, which upon addition to the plant oil double bonds, yield good leaving groups. Examples of suitable addition catalysts according to the invention include, but are not limited to: halogens of the structure $X_2$ wherein $X_2$ includes $I_2$, $Br_2$ and $Cl_2$; and hydrohalogens of the structure HX wherein HX includes HI, Hbr and HCl. The halogen $X_2$ functions as a starting catalyst and HX as a finishing catalyst. It is believed that the catalysis proceeds in a manner well known to addition chemistry to form an intermediate. The halogen $X_2$ is added onto the carbon-carbon double bond of plant oil molecules. It is believed that the next step proceeds in a manner well known in $SN_2$ chemistry, replacing the leaving group to form a novel plant polyol. Hydro-halogen HX undergoes addition reaction with a next plant oil molecule or next fatty acid branch of plant oil molecule to give a halogenation product, then the halogenated product undergoes replacement reaction with dihydroxyalkylamine to form the plant polyol and HX. The addition reaction and replacement reaction repeats until the designed reactant, e.g. dihydroxylalkylamine, completely disappears.

It is foreseen that other catalysts may be utilized according to the invention as long as such catalysts perform addition reactions to double bonds and in so doing add a good leaving group. Furthermore, according to the invention, halogen catalysts and hydro-halogen catalysts can be added to cold or hot plant oils. Halogen catalysts may be added to a plant oil in a first step, and once the halogen disappears, a designed reactant, such as a polyhydroxylalkyl amine may be added. Co-addition of the catalyst and the designed reactant is also possible. In a preferred process according to the invention, a hydro-halogen catalyst is added to a plant oil in a first step, followed by the addition of a dihydroxyalkylamine.

Suitable reaction temperatures of processes according to the invention are generally between about 120° F. (48° C.) and about 270° F. (132° C.). Reaction times typically depend on the identity of the catalyst and the reaction temperature. If the reaction is catalyzed by iodine or hydrogen iodide, the reaction is typically faster than reactions catalyzed by other halogen catalysts. The use of greater amounts of a catalyst typically shortens reaction time.

A preferred process according to the invention is the addition of a polyhydroxylalkyl amine molecule onto the olefin groups of a plant oil such as soybean oil. In particular, the designed reactant, a dihydroxlalklamine, contains a primary amine as the nucleophile and two hydroxyl groups as the active hydrogen groups. The reactant adds directly onto the molecule of plant oil in one step, giving a new plant polyol. The following is believed to be a possible mechanism for such a process:

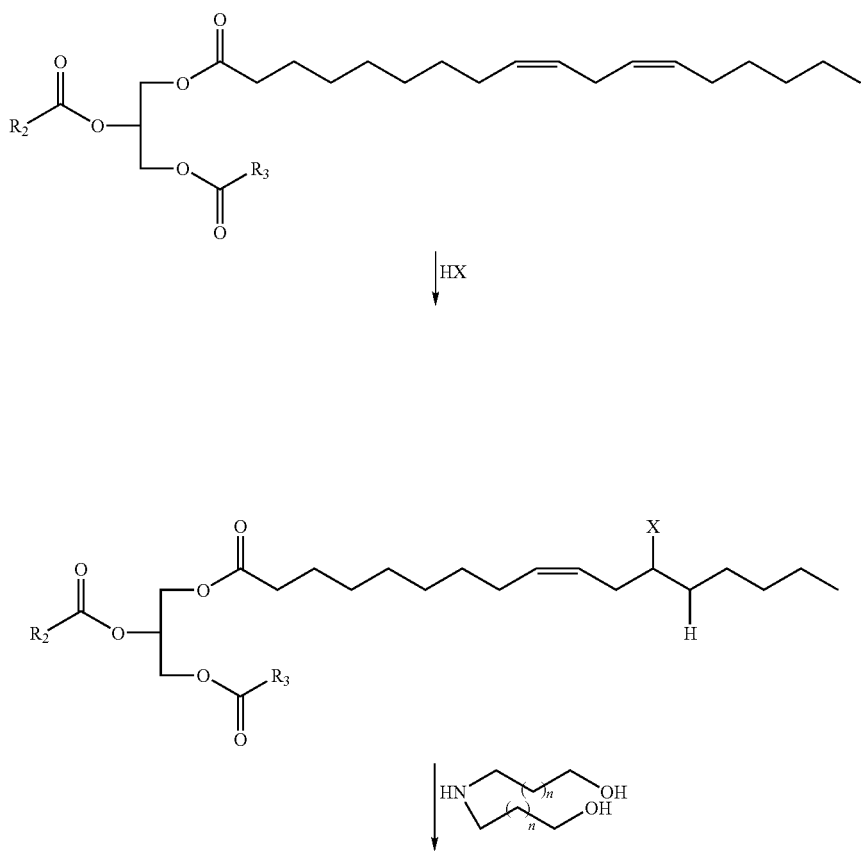

-continued

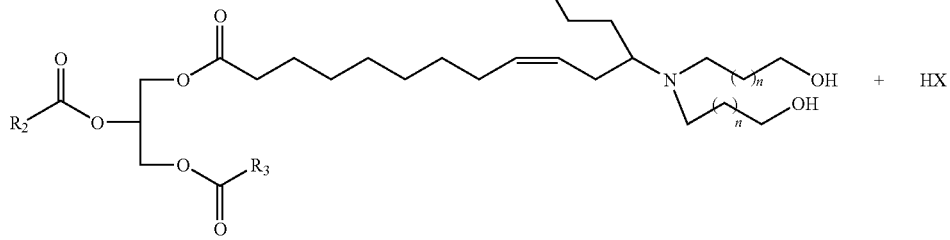

A preferred process according to the invention is catalyzed by iodine. It is believed that an addition reaction occurs, with an iodine atom acting as a leaving group for the incoming nucleophile. It appears that the hydroxyl number of the plant polyol depends on the amount of dihydroxyalkylamine used in the addition reaction. Viscosity of inventive plant polyols of this application typically range between about 250 cps and about 450 cps at room temperature (about 77° F. (25° C.)), which is considered in the art as quite low for a soy polyol. In contrast, commercially known plant polyols typically have a high viscosity, ranging between about 1,200 cps and about 20,000 cps, depending on the hydroxyl number. The high viscosity of known plant polyols can cause mixing difficulties during the formulation of polyurethane.

Furthermore, known plant polyols often have low reactivity due to steric hindrance caused by the presence of secondary alcohols. Such low reactivity yields polyurethanes with poor physical properties. In contrast, plant polyols of the present invention may be designed to contain only primary hydroxyl groups that are known to be quite reactive. Also, in contrast to current epoxide synthetic pathway technology, processes according to the invention result in fewer by-products, as evidenced by the comparatively lower viscosity and lighter color of plant polyols produced according to the invention. In light of these superior properties, good polyurethane foams and elastomers can be made directly from polyols made according to the invention, without using other polyols. Thus, polyols derived from fossil fuels may be completely replaced by plant polyols in the production of polyurethanes, in a cost effective manner, by using the methods and plant polyols according to the invention.

Polyurethanes may be produced by reacting the plant polyols of the invention with a variety of isocyanates, including but not limited to aromatic isocyanates, aliphatic isocyanates, and isocyanate terminated pre-polymers. The physical properties of polyurethane made from the inventive plant polyols depend on the polyols, the formulation and the isocyanate used. Preferred isocyanates include diphenylmethane diisocyanate (MDI) and polymeric diphenylmethane diisocyanate. Other suitable isocyanates include toluene diisocyanate (TDI), methylenebis (cyclohexyl) isocyanate ($H_{12}MDI$), isophorone diisocyanate (IPDI), hexamethylene diisocyanate (HDI), and adducts and pre-polymers of such isocyanates.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

The following examples of compositions according to the invention are provided for illustration. Any parts and percentages are by weight of the composition unless otherwise indicated.

EXAMPLE 1

| Component | Amount (grams) |
| --- | --- |
| Soybean oil | 309.60 |
| Iodine | 0.60 |
| Diethanolamine | 58.11 |
| Diphenylmethane diisocyanate | 13.00 |

The above amounts of diethanolamine and iodine were added to the above amount of soybean oil with stirring. The mixture was stirred for 18 hours at between about 195° F. (90° C.) and about 236° F. (113° C.), then cooled to room temperature to give about 368.31 grams clear liquid soy-polyol with a hydroxyl number of 182 and a viscosity of 364 cps. An amount of 30.82 grams of the polyol was then reacted with the above disclosed amount of diphenylmethane diisocyanate, yielding a solid soy polyurethane material.

EXAMPLE 2

| Component | Amount (grams) |
| --- | --- |
| Soybean oil | 309.60 |
| Iodine | 0.60 |
| Diethanolamine | 58.11 |
| Diphenylmethane diisocyanate | 13.00 |

The above amounts of diethanolamine and iodine were added to the above amount of soybean oil with stirring. The mixture was stirred for 40 hours between about 175° F. (79° C.) and about 205° F. (96° C.), then cooled to room temperature to give 368.31 grams of clear liquid soy polyol with a hydroxyl number of 179 and a viscosity of 360 cps. A reaction mixture of about 30.82 grams of the soy polyol with the above amount of diphenylmethane diisocyanate yielded a solid soy polyurethane material.

EXAMPLE 3

| Component | Amount (grams) |
|---|---|
| Soybean oil | 309.60 |
| Iodine crystal | 0.60 |
| Diethanolamine | 58.11 |
| Diphenylmethane diisocyanate | 13.00 |

The above-identified amount of iodine was added to the above amount of soybean oil with stirring at room temperature. The mixture was then stirred below about 120° F. (48° C.). After the iodine color disappeared the above amount of diethanolamine was added to the mixture. The mixture was stirred for 40 hours at between about 175° F. (79° C.) and about 205° F. (96° C.), then cooled to room temperature to give 368.31 grams clear liquid soy polyol with a hydroxyl number of 178 and a viscosity of 362 cps. A reaction mixture of about 30.82 grams of the polyol and 13.00 grams diphenylmethane diisocyanate yielded a solid soy polyurethane material.

EXAMPLE 4

| Component | Amount (grams) |
|---|---|
| Soybean oil | 309.60 |
| Iodine | 2.40 |
| Diethanolamine | 58.11 |
| Diphenylmethane diisocyanate | 13.00 |

The above amounts of diethanolamine and iodine were added to the above amount of soybean oil with stirring. The mixture was stirred for 18 hours at between about 195° F. (90° C.) and about 236° F. (113° C.), then cooled to room temperature to give 370.11 grams clear liquid soy polyol with a hydroxyl number of 174 and a viscosity of 362 cps. A reaction mixture of about 32.24 grams of the polyol and 13.00 grams diphenylmethane diisocyanate yielded a solid soy polyurethane material.

EXAMPLE 5

| Component | Amount (grams) |
|---|---|
| Soybean oil | 339.60 |
| Iodine | 0.60 |
| Diethanolamine | 39.45 |

The above amounts of diethanolamine and iodine were added to the above amount of soybean oil with stirring. The mixture was stirred for 24 hours at between about 179° F. (81° C.) and about 225° F. (107° C.), then cooled to room temperature to give 379.65 grams clear liquid soy polyol with a hydroxyl number of 114 and a viscosity of 310 cps. A reaction mixture of about 49.21 grams of the soy polyol and 46.20 grams isocyanate terminated pre-polymer that contained 10% NCO yielded a soy polyurethane elastomer material.

EXAMPLE 6

| Component | Amount (grams) |
|---|---|
| Corn oil | 309.60 |
| Iodine | 0.60 |
| Diethanolamine | 58.11 |
| Diphenylmethane diisocyanate | 13.00 |

The above amounts of diethanolamine and iodine were added to the above amount of corn oil with stirring. The mixture was stirred for 28 hours at between about 175° F. (79° C.) and about 219° F. (103° C.), then cooled to room temperature to give 368.31 grams clear liquid corn polyol with a hydroxyl number of 175 and a viscosity of 345 cps. A reaction mixture of about 32.06 grams of the corn-polyol and 13.00 grams diphenylmethane diisocyanate yielded a solid corn polyurethane material.

EXAMPLE 7

| Component | Amount | |
|---|---|---|
| Corn oil | 309.60 | grams |
| Hydrochloric acid (37%) | 10.0 | milliliter |
| Diethanolamine | 58.11 | grams |
| Diphenylmethane diisocyanate | 13.00 | grams |

The above amount of hydrochloric acid was added to the above amount of corn oil with stirring at room temperature. The mixture was heated to about 200° F. (93° C.) and reacted for about one hour at about 200° F. (93° C.), followed by distillation to remove water under vacuum at about 200° F. (93° C.). The above indicated amount of diethanolamine was added to the mixture and stirred for 40 hours at between about 200° F. (93° C.) and about 235° F. (112° C.), then cooled to room temperature to give 370.40 grams clear liquid corn polyol with a hydroxyl number of 209 and a viscosity of 340 cps. A reaction mixture of about 31.15 grams of the corn-polyol and 13.00 grams diphenylmethane diisocyanate yielded a solid corn polyurethane material.

EXAMPLE 8

| Component | Amount | |
|---|---|---|
| Corn oil | 309.60 | grams |
| Hydrobromic acid (48%) | 10.0 | milliliter |
| Diethanolamine | 58.11 | grams |
| Diphenylmethane diisocyanate | 13.00 | grams |

The above amount of hydrobromic acid was added to the above amount of corn oil with stirring at room temperature. The mixture was heated to about 160° F. (71° C.) and reacted for 1.5 hours at about 160° F. (71° C.), followed by distillation to remove water under vacuum at about 200° F. (93° C.). The above indicated amount of diethanolamine was added to the mixture at about 200° F. (93° C.) and stirred for 32 hours at between about 180° F. (82° C.) and about 230° F. (110° C.), then cooled to room temperature to give 372.60 grams clear liquid corn polyol with a hydroxyl number of 192 and a viscosity of 351 cps. A reaction mixture of about 29.22 grams of the corn-polyol and 13.00 grams diphenylmethane diisocyanate yielded a solid corn polyurethane material.

EXAMPLE 9

| Component | Amount (grams) |
|---|---|
| Corn oil | 339.60 |
| Iodine | 1.80 |
| Diethanolamine | 26.29 |

The above amounts of diethanolamine and iodine were added to the above amount of corn oil with stirring. The mixture was stirred for about 28 hours at between about 179° F. (81° C.) and about 225° F. (107° C.), then cooled to room temperature to give 367.69 grams clear liquid corn-polyol with a hydroxyl number of 81 and a viscosity of 296 cps. A reaction mixture of about 69.26 grams of the corn-polyol and about 46.20 grams isocyanate terminated pre-polymer that contained 10% NCO yielded a corn polyurethane elastomer material.

EXAMPLE 10

| Component | Amount | |
|---|---|---|
| Rape Seed oil (Canola oil) | 309.60 | grams |
| Hydrobromic acid (56%) | 5.0 | milliliter |
| Diethanolamine | 58.11 | grams |
| Diphenylmethane diisocyanate | 13.00 | grams |

The above amount of hydrobromic acid was added to the above amount of rape seed oil with stirring at room temperature. The mixture was heated to about 120° F. (48° C.) and reacted for one hour at about 120° F. (48° C.). The above indicated amount of diethanolamine was added to the mixture and stirred for 20 hours at between about 180° F. (82° C.) and about 230° F. (110° C.), followed by vacuum distillation at about 200° F. (93° C.) to remove water, followed by cooling to room temperature to give 372.10 grams clear liquid rape seed polyol with a hydroxyl number of 167 and a viscosity of 340 cps. A reaction mixture of about 36.66 grams of the polyol and 13.00 grams diphenylmethane diisocyanate yielded a solid rape seed polyurethane material.

EXAMPLE 11

| Component | Amount | |
|---|---|---|
| Rape Seed oil (Canola oil) | 350.00 | grams |
| Bromine | 3.00 | milliliter |
| Diethanolamine | 52.57 | grams |
| Diphenylmethane diisocyanate | 13.00 | grams |

The above amount of bromine was added to the above amount of Canola oil with stirring at room temperature. The mixture was reacted for one hour at room temperature followed by addition of the above amount of diethanolamine. The mixture was stirred for 20 hours at between about 180° F. (82° C.) and about 230° F. (110° C.) and then cooled to room temperature to give 411.93 grams liquid rape seed-polyol with a hydroxyl number of 146 and a viscosity of 320 cps. A reaction mixture of about 38.42 grams of the polyol and 13.00 grams diphenylmethane diisocyanate yielded a solid rape seed polyurethane material.

EXAMPLE 12

| Component | Amount (in grams) |
|---|---|
| Rape Seed oil (Canola oil) | 350.00 |
| Iodine | 1.00 |
| Diethanolamine | 52.57 |
| Diphenylmethane diisocyanate | 13.00 |

The above amount of iodine was added to the above amount of rape seed oil with stirring at room temperature. The mixture was reacted for twenty minutes at about 120° F. (48° C.) followed by addition of the above amount of diethanolamine. The mixture was stirred for 20 hours at between about 180° F. (82° C.) and about 230° F. (110° C.) and then cooled to room temperature to give 403.57 grams liquid rape seed-polyol with a hydroxyl number of 152 and a viscosity of 315 cps. A reaction mixture of about 35.96 grams of the polyol and 13.00 grams diphenylmethane diisocyanate yielded a solid rape seed polyurethane material.

EXAMPLE 13

| Component | Amount (in grams) |
|---|---|
| Rape Seed oil (Canola oil) | 350.00 |
| Iodine | 1.00 |
| Diethanolamine | 26.29 |
| Diphenylmethane diisocyanate | 7.50 |

The above amounts of iodine, diethanolamine and rape seed oil were mixed with stirring at room temperature. The mixture was stirred for 25 hours at between about 180° F. (82° C.) and about 220° F. (104° C.) and then cooled to room temperature to give 377.29 grams liquid rape seed-polyol with a hydroxyl number of 74 and a viscosity of 310 cps. A reaction mixture of about 37.73 grams of the polyol and 7.5 grams polymeric diphenylmethane diisocyanate yielded a solid rape seed polyurethane material.

EXAMPLE 14

| Component | Amount (in grams) |
|---|---|
| Sunflower Oil | 300.00 |
| Iodine | 1.20 |
| Diethanolamine | 26.29 |
| Diphenylmethane diisocyanate | 7.40 |

The above amounts of iodine, diethanolamine and sunflower oil were mixed with stirring at room temperature. The mixture was stirred for 23 hours at between about 180° F. (82° C.) and about 210° F. (98° C.) and then cooled to room temperature to give 327.49 grams liquid sunflower-polyol with a hydroxyl number of 91 and a viscosity of 290 cps. A reaction mixture of about 30.82 grams of the polyol and 7.4 grams polymeric diphenylmethane diisocyanate yielded a solid sunflower polyurethane material.

EXAMPLE 15

| Component | Amount (in grams) |
| --- | --- |
| Peanut Oil | 380.00 |
| Iodine | 2.00 |
| Diethanolamine | 52.57 |
| Diphenylmethane diisocyanate | 14.50 |

The above amounts of iodine, diethanolamine and peanut oil were mixed with stirring at room temperature. The mixture was stirred for 23 hours at between about 180° F. (82° C.) and about 230° F. (110° C.) and then cooled to room temperature to give 434.57 grams liquid peanut polyol with a hydroxyl number of 144 and a viscosity of 320 cps. A reaction mixture of about 38.96 grams of the polyol and 14.5 grams polymeric diphenylmethane diisocyanate yielded a solid peanut polyurethane material.

EXAMPLE 16

| Component | Amount (in grams) |
| --- | --- |
| Olive Oil | 300.00 |
| Iodine | 3.00 |
| Diethanolamine | 52.57 |
| Diphenylmethane diisocyanate | 14.50 |

The above amounts of iodine, diethanolamine and olive oil were mixed with stirring at room temperature. The mixture was stirred for 26 hours at between about 180° F. (82° C.) and about 220° F. (104° C.) and then cooled to room temperature to give 355.57 grams liquid olive-polyol with a hydroxyl number of 171 and a viscosity of 330 cps. A reaction mixture of about 32.81 grams of the polyol and 14.0 grams polymeric diphenylmethane diisocyanate yielded a solid olive polyurethane material.

EXAMPLE 17

| Component | Amount |
| --- | --- |
| Soybean Oil | 300.00 grams |
| Iodine | 3.00 grams |
| Bis(2-hydroxypropyl)amine | 66.60 grams |
| Diphenylmethane diisocyanate | 14.50 grams |
| Bismuth neodecanoate | 20 milligrams |

The above amounts of iodine, bis(2-hydroxypropyl)amine and soybean oil were mixed with stirring at room temperature. The mixture was stirred for 26 hours at between about 180° F. (82° C.) and about 220° F. (104° C.) and then cooled to room temperature to give 369.6 grams liquid soybean polyol with a hydroxyl number of 152 and a viscosity of 360 cps. A reaction mixture of about 36.96 grams of the polyol and 14.0 grams polymeric diphenylmethane diisocyanate in the presence of 20 mg Bismuth neodecanoate yields a solid soy polyurethane material.

It is to be understood that while certain forms of the present invention have been described herein, it is not to be limited to the specific forms or arrangement as described and shown.

What is claimed and desired to be secured by Letters Patent is as follows:

1. A process of making a modified plant-based polyol comprising:
    a) reacting the following components in the presence of an addition reaction catalyst selected from the group consisting of halogens, hydrohalogens and combinations thereof:
        I) at least one plant oil having at least one carbon-carbon double bond; and
        ii) a reactant having at least one nucleophilic functional group and at least one active hydrogen functional group.

2. The process of claim 1 wherein the halogens and hydrohalgens are selected from the group consisting of $I_2$, $Br_2$, $Cl_2$, HI, HBr, HCl and combinations thereof.

3. The process of claim 1 wherein the nucleophilic functional group is selected from the group consisting of amines, thiols, phosphines and combinations thereof.

4. The process of claim 1 wherein the active hydrogen functional group is selected from the group consisting of amines, thiols, carboxylic acids and combinations thereof.

5. The process of claim 1 wherein the reaction is performed at a temperature of between about 120° F. (48° C.) and about 270° F. (132° C.)

6. The process of claim 1 further comprising the step of preparing a homologue derivative of the plant polyol produced in step a).

7. A reaction product of at least one plant oil having at least one carbon-carbon double bond with a reactant having at least one nucleophilic functional group and at least one active hydrogen functional group, the reaction performed in the presence of an addition reaction catalyst selected from the group consisting of halogens, hydrohalogens and combinations thereof.

8. The product of claim 7 further comprising homologue derivatives of the reaction product.

* * * * *

UNITED STATES PATENT AND TRADEMARK OFFICE
CERTIFICATE OF CORRECTION

PATENT NO. : 7,674,925 B2  Page 1 of 1
APPLICATION NO. : 11/524603
DATED : March 9, 2010
INVENTOR(S) : Thomas M. Garrett and Xian Xian Du It is certified that error appears in the above-identified patent and that said Letters Patent is hereby corrected as shown below:

Title Page, Item (75) Inventors:
Please correct the inventor's name from Xian Xia Du to Xian Xian Du.

Signed and Sealed this

Fourteenth Day of September, 2010

David J. Kappos
*Director of the United States Patent and Trademark Office*